Oct. 15, 1963  E. D. RAPISARDA  3,107,032
REGISTER MEANS FOR LIQUID DISPENSING UNIT
Filed Jan. 25, 1961  4 Sheets-Sheet 2
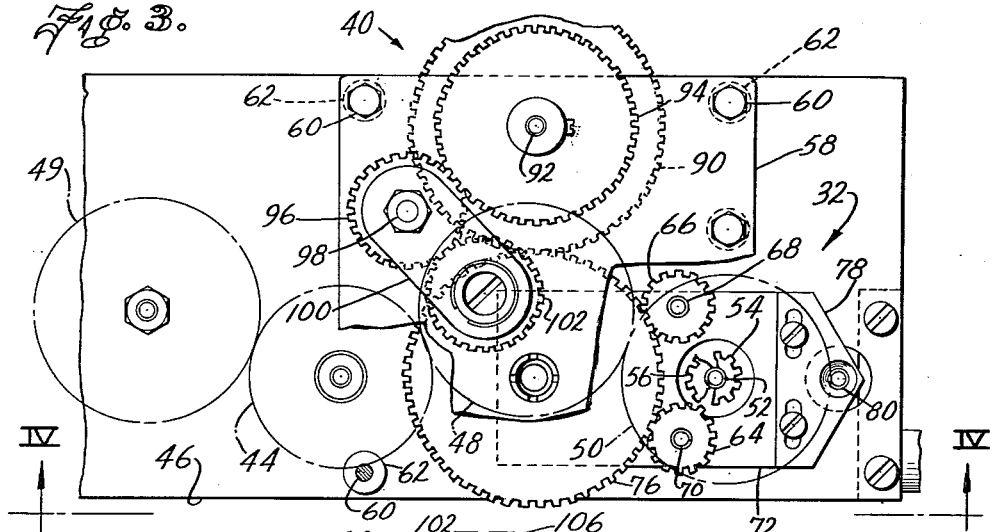
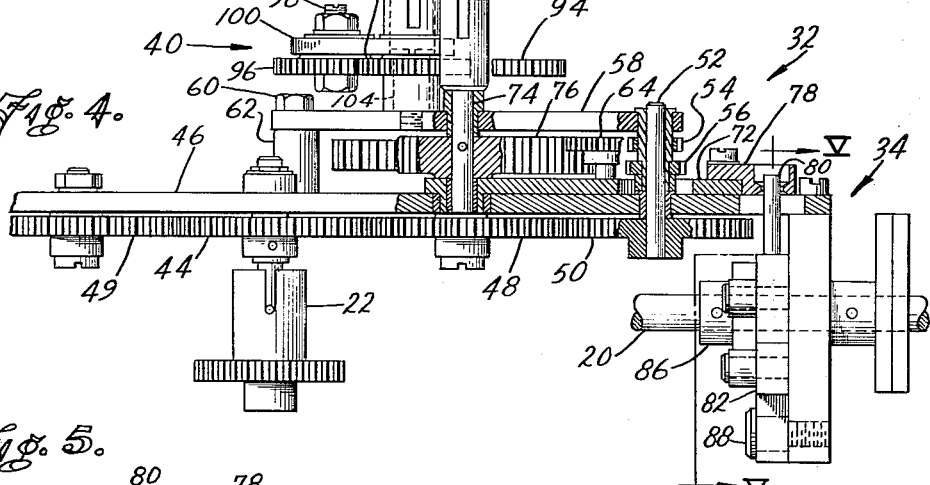
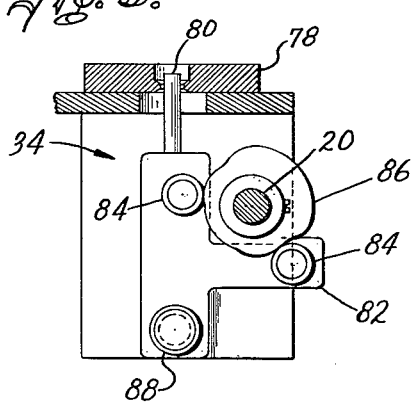
INVENTOR.
EDWARD D. RAPISARDA
BY Chapin & Neal
ATTORNEYS

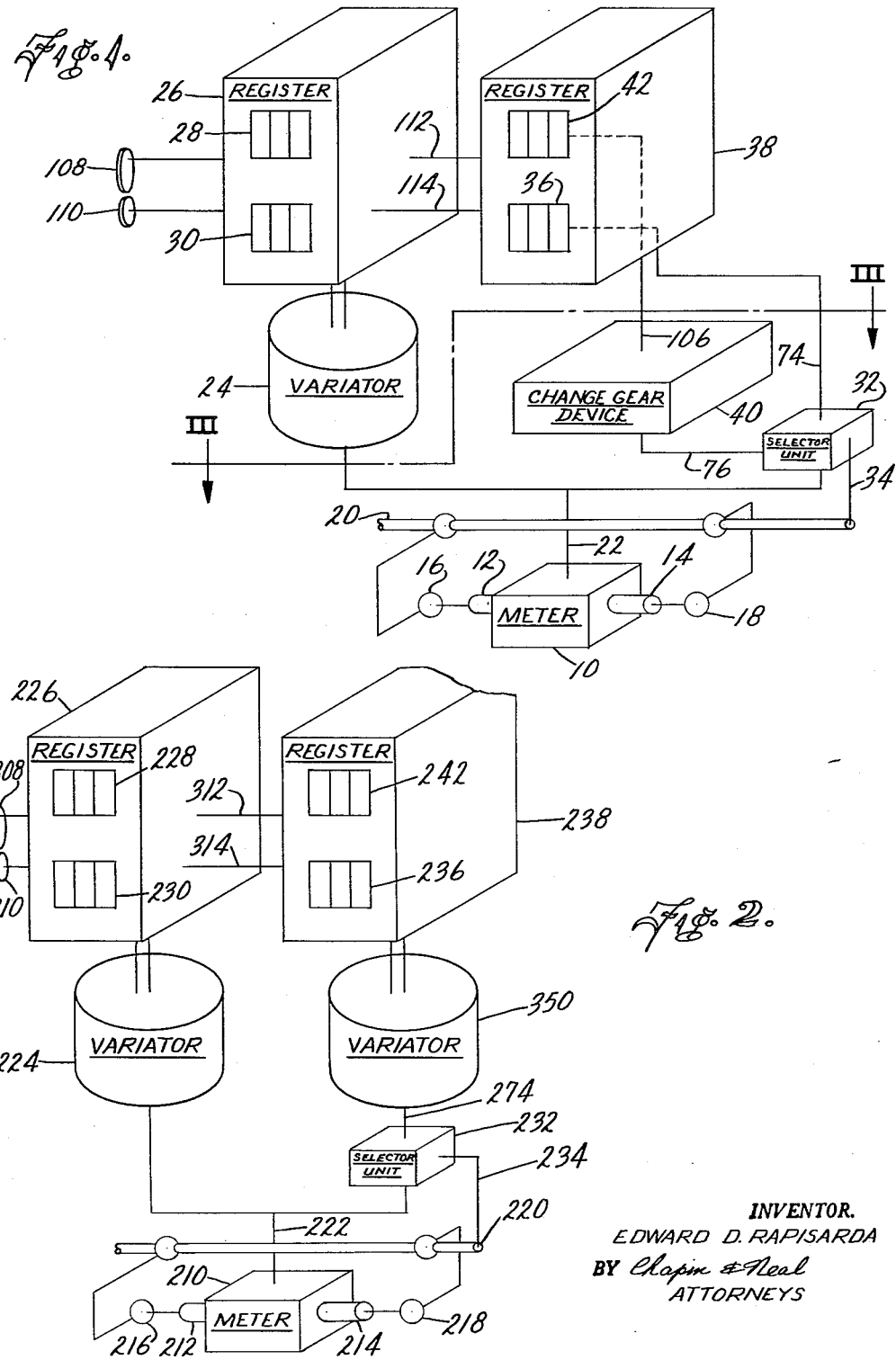

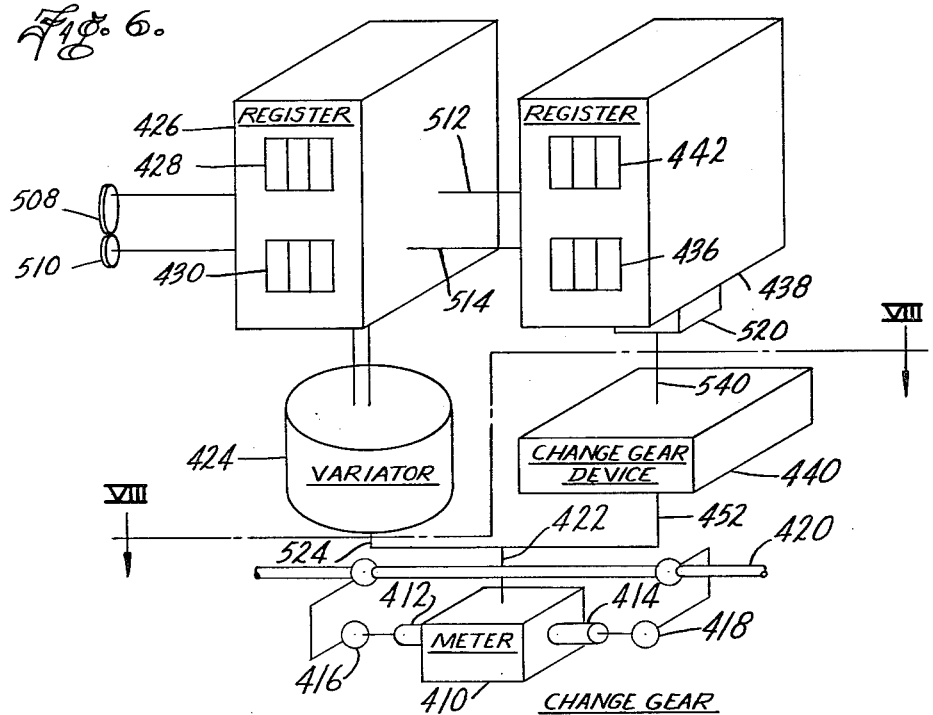
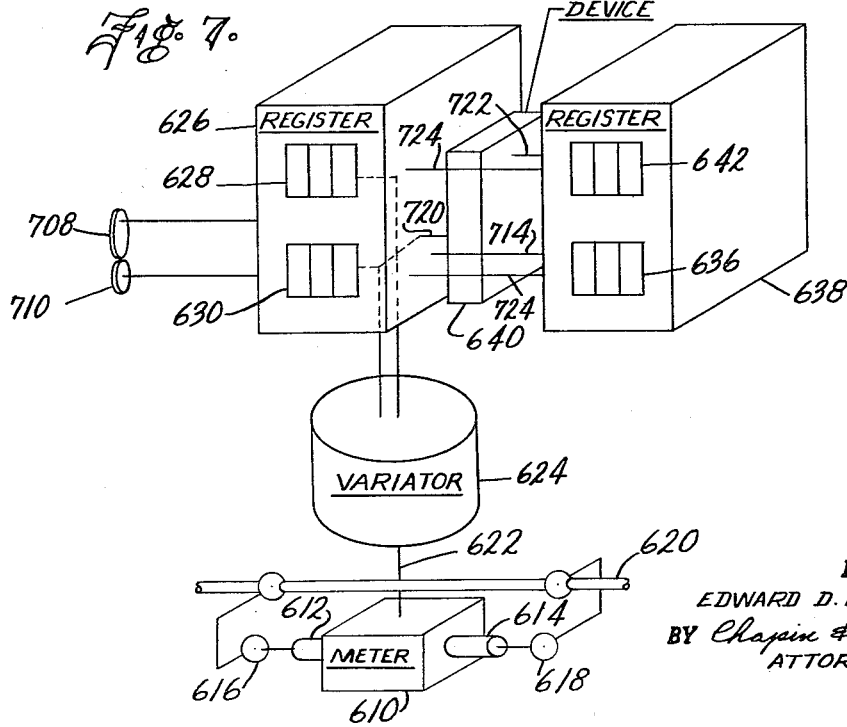

Oct. 15, 1963  E. D. RAPISARDA  3,107,032
REGISTER MEANS FOR LIQUID DISPENSING UNIT
Filed Jan. 25, 1961  4 Sheets-Sheet 4
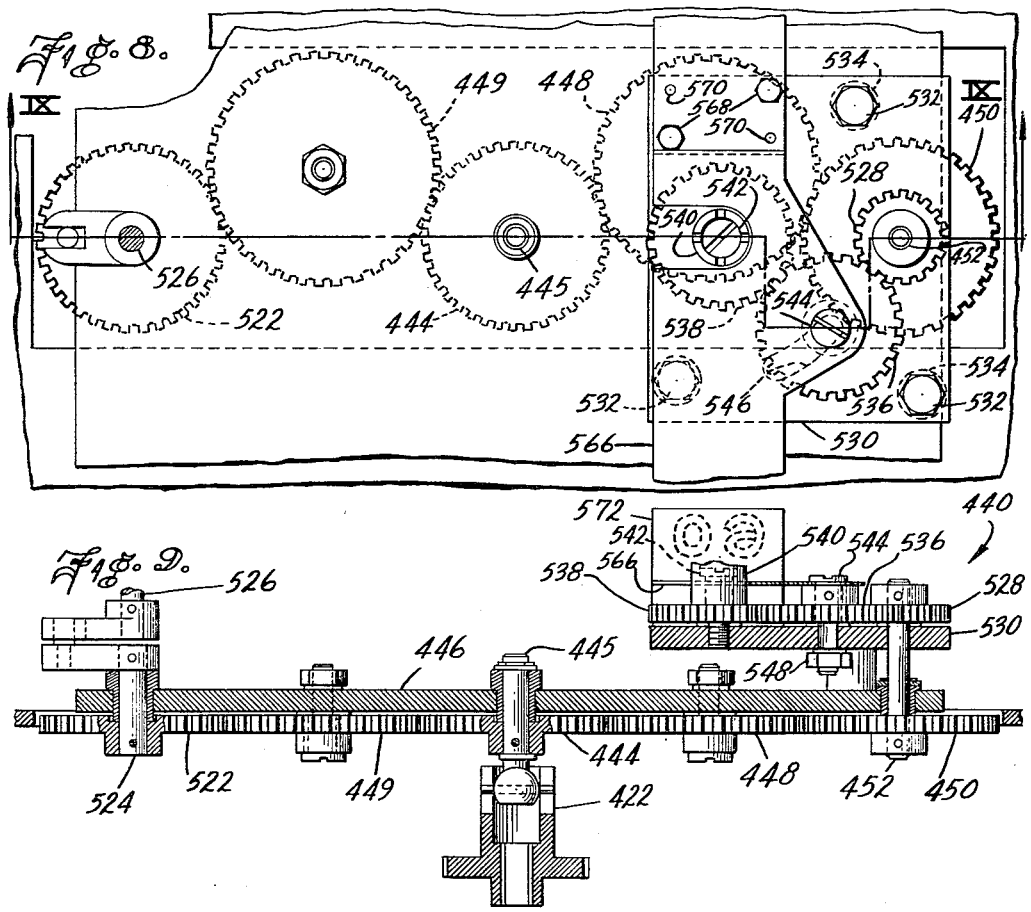
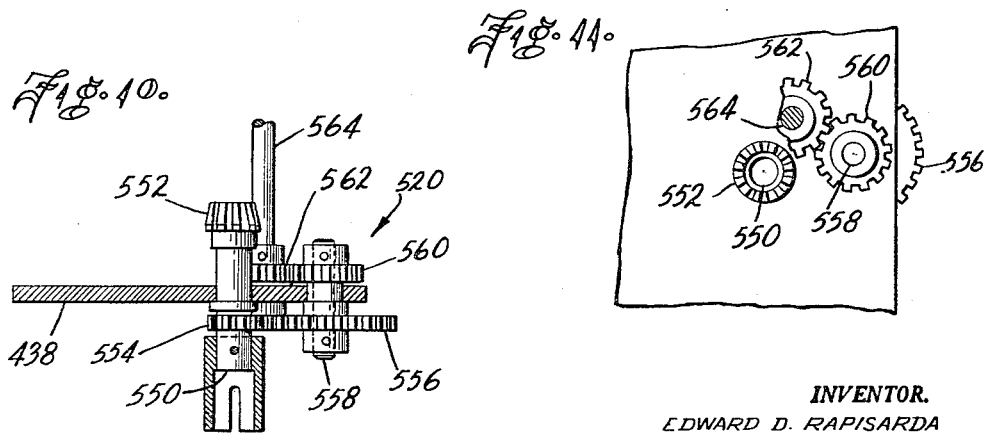
INVENTOR.
EDWARD D. RAPISARDA
BY Chapin & Neal
ATTORNEYS United States Patent Office 3,107,032
Patented Oct. 15, 1963

3,107,032
REGISTER MEANS FOR LIQUID DISPENSING UNIT
Edward D. Rapisarda, West Springfield, Mass., assignor to Gilbert & Barker Manufacturing Company, West Springfield, Mass., a corporation of Massachusetts
Filed Jan. 25, 1961, Ser. No. 84,894
4 Claims. (Cl. 222—26)

The present invention relates to improvements in register means used to give a visual indication of the amount, cost or some other factor pertaining to the delivery of a product, such as gasoline, from a dispensing unit.

The object of the invention is to provide register means of greater utility which will make available more information or intelligence relative to the product delivered than has hitherto been provided and in a more limited sense to provide means for the visual display of the cost, or the cost and volume, of oil delivered as an admixture with gasoline, as well as the cost and volume of gasoline in each delivery from a dispensing unit.

Another object of the invention is to attain the above ends with a minimum of cost and in a manner requiring minimum modification of existing components.

The above and other related objects and features of the invention will be apparent from a reading of the description of the disclosure found in the accompanying drawings and the novelty thereof pointed out in the appended claims.

In the drawings:

FIG. 1 is a diagrammatic representation of register means embodying the present invention;

FIG. 2 is a diagrammatic representation of an alternate embodiment of the invention;

FIG. 3 is a section taken generally on line III—III in FIG. 1;

FIG. 4 is a view, with portions broken away, taken on line IV—IV in FIG. 3;

FIG. 5 is a section taken on line V—V in FIG. 4;

FIG. 6 is a diagrammatic representation of another alternate embodiment of the invention;

FIG. 7 is a diagrammatic representation of a further embodiment of the invention;

FIG. 8 is a section taken generally on line VIII—VIII in FIG. 6;

FIG. 9 is a section taken generally on line IX—IX in FIG. 8;

FIG. 10 is an elevation partially in section of a gear drive for one of the registers seen in FIG. 6; and FIG. 11 is a plan view of the gear drive seen in FIG. 10.

The register means of the present invention are particularly adapted for use in a gasoline-oil dispensing unit of the type disclosed in my copending application, Serial No. 54,227, filed September 6, 1960. However, as will be apparent from the following description and the appended claims, these register means are not limited in their utility for use with any particular oil-blend dispensing unit, nor to a blending unit insofar as the broader aspects of the invention are concerned.

The dispensing unit of the above mentioned application is adapted to selectively deliver gasoline mixed with one of two possible percentages of oil additive or gasoline alone. Briefly stated, this end is attained by valve means which add a desired, fixed percentage of oil to a measured amount of gasoline so that it is necessary to determine only the amount of gasoline delivered in order to also determine the amount of oil admixture.

This mode of operation will be better understood by reference to FIG. 1 wherein will be seen a conventional gasoline meter 10 of the type shown in U.S. Patent No. 2,121,120 which has been modified to drive oil metering pumps 12 and 14. Gasoline passes through the meter 10 in the usual fashion, and in so doing causes a measured flow of oil to be passed by the pumps 12 and 14. Valve means 16 and 18 control the flow of oil from the pumps 12 and 14, respectively, so that the oil therefrom is either added to the gasoline or bypassed back to the intake side of the pump. Linkage means connect the valve means 16 and 18 to a selector shaft 20 which is manually rotated between three positions. In one position of the shaft 20 the valve means 16 and 18 are set so that oil is added only from the pump 12 to the gasoline at a fixed ratio, say 1 to 20. In the second position of the shaft the valve means are such that no oil is added to the gasoline, and in the third position of the shaft the valve means are such that oil is added only from the pump 14 to the gasoline, say in the fixed ratio of 1 to 24. For a detailed description of these valve means and their operation, reference is made to the above-mentioned application.

The output shaft 22 of the meter 10 drives a variator 24 through the illustrated mechanical connection. A register 26 having cost wheels 28 and volume wheels 30 on each side in the usual fashion is driven from the variator 24, that is, the cost wheels are driven at an adjustable rate dependent on the setting of the variator 24, while the volume wheels 30 are driven at a fixed rate. The volume wheels 30 may be considered as being driven directly from the meter 10, the provision of a drive shaft therefor through the variator 24 being a known feature of convenience.

Except for the offset drive connection between the meter 10 and the variator 24, the meter 10, the variator 24, the register 26, and the mechanical connections therebetween are all as would be found in a conventional gasoline dispensing unit well known to those skilled in the art. The variator 24 and the register 26 are commercially available items which may be purchased from the Veeder-Root Company of Hartford, Connecticut, as Veeder-Root Computer Model 56 Automatic Reset Type.

Also driven from the meter 10 is a selector unit 32 which is controlled through the illustrated mechanical connection 34 by rotative movement of the selector shaft 20. The selector unit has a direct mechanical connection to the volume wheels 36 of a register 38 which is substantially identical with the register 26. The selector unit 32 also has a mechanical connection with a change gear device 40 which in turn has a driving connection with the price indicating wheels 42 of the register 38.

When the selector shaft 20 is set for the delivery of gasoline alone, the selector unit 32 is in a neutral position and the numeral wheels 36 or 42 on the register 38 remain in their zero positions. When the shaft 20 is rotated for delivery of oil admixture from the pump 12, the selector unit 32 is set to rotate the wheels 36 at a rate reflecting one quart for each five gallons of gasoline. The selector unit 32 also establishes the correct drive through the change gear device 40 to rotate the wheels 42 so that they reflect the cost of the oil delivered. Correspondingly, when the shaft 20 is rotated for delivery of oil from the pump 14, the selector unit 32 is set to rotate the volume wheels 36 at the proper rate to reflect the delivery of one quart of oil for each six gallons of gasoline. The change gear device 40 is likewise driven at the proper rate for the wheels 42 to reflect the cost of oil delivered at this particular ratio.

In case of a change in the price of oil, a new gear is inserted in the change gear device 40 so that the wheels 42 will reflect the new oil price.

Reference is now made to FIGS. 3 and 4 for a description of the constructional details of the selector unit 32 and change gear device 40. The meter shaft 22 is drivingly coupled to a gear 44 which is rotatably mounted on a plate 46. The plate 46 is secured to a fixed frame member (not shown) and carries idler gears 48 and 49.

Idler gear 49 is part of a gear train for driving the variator 24 in a manner described in greater detail in connection with the embodiment of FIG. 6. Idler gear 48 drives a gear 50 which is secured to a shaft 52 which is journaled at its lower end on the plate 46. The upper end of the shaft 52 is journaled in a plate 58 which is secured to the plate 46 by screws 60 and spaced thereabove by collars 62.

Shaft 52 provides the input drive for the selector unit 32 and has secured thereto pinions 54 and 56. Pinion 54 is positioned in the same horizontal plane as an idler gear 64, while pinion 56 is positioned in the same horizontal plane as an idler gear 66. Idler gears 64 and 66 are rotatably mounted on studs 68 and 70 respectively, which project from a swivel plate 72. The swivel plate 72 is slotted to provide clearance for the shaft 52 and is mounted for pivotal movement about the axis of a shaft 74. The lower end of the shaft 74 is journaled in the swivel plate 72, with its upper end being journaled in the plate 58. A gear 76 is secured to the shaft 74 and has a face width sufficient to mesh with both of the gears 64 and 66. The gear 76 and shaft 74 may be considered the output of the selector unit 32.

The swivel plate 72 is compositely formed and comprises an adjustable end piece 78 which receives a finger 80 (see also FIG. 5). The finger 80 and the parts now to be described comprise the mechanical connection 34 between the selector unit 32 and the selector shaft 20. Finger 80 projects from a T-shaped lever 82 having thereon cam rolls 84 which engage a conjugate cam 86. Cam 86 is secured to the selector shaft 20 while the lever 82 is mounted for pivotal movement about a fixed shoulder screw 88.

The selector unit 32 is illustrated in its neutral position which would be its position when gasoline alone is being delivered from the dispensing unit. It this position the input shaft 52 will rotate when gasoline is delivered, but since neither of the pinions 54 or 56 meshes with the gears 64 or 66, the gear 76 will remain stationary, i.e. immobile, and there will be no output from the selector unit 32. Assuming an oil admixture is to be delivered with the gasoline, the shaft 20 will be rotated to render one or the other of the pumps 12 or 14 operational, and in so doing will mesh either the pinion 54 with the gear 64, or the pinion 56 with the gear 66. As gasoline passes through the meter 10, the output of the selector unit 32 will reflect the proportion of oil admixture in the gasoline.

The output shaft 74 of the selector unit 32 is directly coupled (as indicated in FIG. 1) to the conventional volume indicating input connection with the register 38 and thereby rotates the volume wheels 36 at the proper rate.

The change gear device 40 (FIGS. 3 and 4) is driven by the gear 76 which meshes with a gear 90 secured to a shaft 92. The shaft 92 is journaled in the plates 46 and 58 with its upper end projecting above the latter plate. A change year 94 is replaceably secured to th eshaft 92 and meshes with an idler gear 96. The idler gear 96 is journaled on a shoulder screw 98 secured to an arm 100. The arm 100 is pivotally mounted on the hub of a gear 102 for swinging movement about the axis thereof. The gear 102 is journaled on a shoulder screw 104 threaded into the upper surface of the plate 58. A shaft-like element 106 extends from the gear 104 and serves as the output of the change gear device 40. The shaftlike element 106 is connected (as indicated in FIG. 1) to the drive input of the register 38 for the cost indicating wheels 42. The wheels 42 are thus driven at a rate proportionate or dependent upon the amount of oil admixture and at a rate also reflecting the unit cost of the oil. As the unit cost of the oil varies, the change gear 94 will be replaced with a new gear of a different and appropriate size to reflect the new oil price.

Bracket means (not shown), later described in connection with FIGS. 8 and 9, positively locates the shoulder screw 98 so that the gear 96 will mesh only with a change gear 94 of the proper size to reflect the established unit price of the oil. This oil price is displayed on a portion of the bracket visible from the exterior of the dispensing unit.

The register 26, as indicated above, is of known commercial design and in its operation necessitates the manual use of an operating lever 108 and a reset knob 110 (FIG. 1). The operating lever is swung 90° to set the dispensing unit in operation and, in the case of the register referred to, this action also axially shifts the shafts on which the numeral wheels 28 and 30 are mounted. The reset knob 110 is twisted to release spring mechanism which automatically returns the numeral wheels 28 and 30 to a zero setting. The same mechanism is provided in the register 38 for axially shifting the shafts of the numeral wheels 42 and 36. A shaft 112 connects a reset shaft in the register 26 with a corresponding shaft in the register 38. Both reset shafts are rotated by the operating lever 108 so that both registers 26 and 38 may be operated by the single lever. When the knob 110 is twisted to zero the numeral wheels 28 and 30, an internal shaft in the register 26 is rotated. A shaft 114 connects this internal shaft with the corresponding shaft in the register 38 so that rotation of one shaft controls rotation of the other and results in the simultaneous zeroing of the numeral wheels 30 and 36.

In summary, the present register means is incorporated in a known dispensing unit design without requiring any change in its mode of operation. Thus, the shaft 20 is set for the delivery of the desired oil admixture or gasoline alone. The handle 108 and knob 110 are manipulated in the usual fashion for registers of the type referred to. The cost and volume of oil admixture will be shown by the register wheels 42 and 36 and in the event gasoline alone is being delivered, these wheels will remain at "zero."

Reference is now made to FIG. 2 for a description of an alternate form of the invention. To a large extent the elements of this embodiment correspond to those previously described and are indicated by like reference characters increased by 200. A meter 210 is again provided to measure the rate of flow of gasoline and means controlled by a selector shaft 220 are provided to control valves 216 and 218 which control the flow of an admixture of fixed proportions of oil from either of pumps 212 or 214. The output shaft 222 of the meter 210 drives a variator 224 which in turn is drivingly connected to a register 226 having price indicating wheels 228 and volume indicating wheels 230. A selector unit 232 is also drivingly connected to the meter shaft 222 and is linked to the selector shaft 220 by a mechanical connection 234. The rotational position of the shaft 220 controls the selector unit 232 so that the output therefrom, as indicated by the element 274, will be driven at a rate reflecting the percentage of oil being added to the gasoline with the output thereof being immobile when gasoline is delivered alone from the dispensing unit. A second variator 350 is drivingly connected to the selector unit 232 and is in turn drivingly connected to a second register 238 having price indicating wheels 242 and volume indicating wheels 236 which are driven from the variator 350 to reflect the cost and volume of oil admixture delivered with the gasoline. Interconnections 312 and 314 are made between the registers 238 and 226 and correspond to the connections 112 and 114 described in connection with FIG. 1 so that the registers may both be actuated and reset by operation of lever 308 and knob 310. The register 238 is the same in construction as the register 38 previously described.

The embodiment of the invention seen in FIG. 6 corresponds in many respects to the embodiment of FIG. 1, and in other respects is more closely related to the disclosure in the aforementioned application. Where applicable, like parts will be identified by like reference characters increased by 400. As before, a meter 410 drives a variator 424, which in turn rotates the cost and volume wheels 428 and 430 of a register 426. Metering pumps 412 and 414 are controlled by valve means 416 and 418 for the selective addition of a fixed percentage of oil to the gasoline. Valve means 416 and 418 are selectively controlled by shaft 420. The drive shaft 422 of the meter 410 is drivingly connected to a change gear device 440. The change gear device 440 drives a gear unit 520 which in turn drives register wheels 436 and 442 of a register 438. The register wheels 436 are arranged to rotate at a rate reflecting the cost of oil delivered by the metering pump 412, while the register wheels 442 are arranged to rotate at a rate reflecting the price of oil delivered through the metering pump 414. Shutter means, not shown, but described in the aforementioned application, are controlled by the shaft 420 to expose the register wheels 436 or 442, corresponding to the pump 412 or 414 which is operative to deliver an admixture of oil into the gasoline. The shutter means are arranged to cover both sets of register wheels 442 and 436 when gasoline alone is being delivered from the dispensing unit.

The drive from the meter 410 to the variator 424 and change gear device 440, as well as the details of the latter, can be best understood by referring to FIGS. 8 and 9. It will there be seen that the meter shaft 422 is coupled to a gear 444 which is secured to a shaft 445 journaled on plate 446. Plate 446 is secured to a fixed frame member. Gear 444 meshes with an idler gear 449 which is rotatably mounted on plate 446. Idler gear 449 meshes with and drives a gear 522, secured to shaft 524. Shaft 524 is connected through a universal coupling to a shaft 526 and becomes the input for the variator 424.

Gear 444 also meshes with a gear 448, which in turn drives a gear 450. The gear 450 is secured to a shaft 452 which, in the present embodiment, is the drive input for the change gear device 440.

The change gear device 440 comprises a gear 528 secured to the upper end of the shaft 452. The shaft 452 is journaled at its lower end on the plate 446 and at its upper end on a plate 530. Plate 530 is secured to the plate 446 by screws 532 and is spaced thereabove by collars 534. The gear 528 meshes with an idler gear 536 which in turn drives a gear 538. The gear 538 has an integral hub 540 which serves as the output from the change gear device 440 and is drivingly connected to the input of the gear unit 520. The gear 538 is journaled on a shoulder screw 542, while the gear 536 is journaled on the shoulder screw 544. The shoulder screw 542 is threaded into the plate 530, while the shoulder screw 544 passes through a slot 546 in the plate 530 and is held in fixed angular relation relative to the axis of gear 538 by a nut 548. The gear 528 is a change gear which may be replaced to vary the speed of the output shaft 540 to correspond to the price of the oil.

The output shaft 540 of the change gear device 440 is coupled to the input shaft 550 of the gear unit 520. A bevel gear 552 is secured to the upper end of the shaft 550 and corresponds to a bevel gear found in the existing registers of the type above described for driving the register wheels 436.

A spur gear 554 is formed on the shaft 550 and meshes with a gear 556 secured to a shaft 558. The shaft 558 is journaled in the base of the register 438 and has a gear 560 secured to its upper end. The gear 560 meshes with a gear 562 which is secured to a shaft 564. The shaft 564 corresponds to an existing shaft in the register for driving the register wheels 442. The gearing of unit 520 is provided to establish a predetermined ratio between the rates of rotation of the wheels 436 and the wheels 442 so that one set of wheels will at all times reflect the percent of oil added by the metering pump 412, while the other set of wheels will reflect the amount of oil added by the metering pump 414.

The change gear device 440 is provided so that the wheels 436 and 442 will additionally reflect the unit price of the oil, and the values appearing on the wheels 442 and 436 will indicate the total value of the oil added. This, of course, would be true only for the set of wheels which is exposed, to correspond to the metering pump 412 or 414 which is operative.

As a protection to the purchasing public, a bracket 566 is secured to the plate 530 by screws 568 and accurately located by dowels 570. The bracket 566 is apertured to receive the shoulder screw 544 on which the idler gear 536 is mounted. In this fashion the idler gear 536 is positively located so that it will properly mesh with only one size change gear 528. The bracket 566 has at either end an upstanding portion 572 which bears indicia giving the unit price of the oil corresponding to the size change gear 528 mounted in the device 440. In order to properly display the unit price of the oil being added to the gasoline, it is necessary to secure the bracket 566 to the plate 530, thereby limiting the size of change gear 528 to the proper size for the price displayed.

The operation of this register means is much the same as that of the registers previously described. Thus, an operating handle 508 is provided to turn the dispensing unit on and off and to axially shift the shafts for the numeral wheels 428 and 430 as required for registers of this type. Resetting of the registers is accomplished by twisting a knob 510. Interconnections 512 and 514 are made between the registers 426 and 438 and correspond to the connections 112 and 114 which enable both registers to be actuated and reset by operation of the lever 508 and knob 510.

Referring now to FIG. 7, a further embodiment of the invention will be described. This embodiment also corresponds in many respects to the embodiment of FIG. 1 and like parts will be identified by corresponding reference characters increased by 600. A meter 610 drives a variator 624 which in turn rotates the cost and volume wheels 628 and 630 of a register 626. Metering pump 612 and 614 are controlled by valve means 616 and 618 for the selective addition of a fixed percentage of oil to the gasoline. Valve means 616 and 618 are selectively controlled by shaft 620.

From the driving means for the volume wheels 630, a shaft 720 is driven to provide the input for a change gear device 640. The change gear device 640 comprises essentially the same functional elements as the change gear device 440, that is, the change gear device 640 has a replaceable change gear which is selected so that the output therefrom will reflect the unit price of the oil being added to the gasoline. The output 722 from the change gear device 640 drives register wheels 642 and 636 of register 638. Means (corresponding to gear unit 520) are provided internally of register 638 for driving the wheels 642 and 636 at different rates, which rates reflect the rates at which oil is added to the gasoline by the pumps 612 and 614 respectively. As in the FIG. 6 embodiment, shutter means (not shown) cover over the wheels 636 or 642 or both depending on what admixture of oil is being delivered.

It is intended that the register 726 and 738 have wheels on only one side thereof to minimize the expense of duplicate parts necessary for displaying cost and volume figures on both sides of the dispensing unit. Under these circumstances and with the compact arrangement attained by disposing the change gear device between the two registers, the shafts for the register wheels 628 and 642 are linked together by a shaft 724 and the shafts for the register wheels 630 and 636 are linked together by a shaft 724. In this manner provision is made for the shafts of both registers to be axially shifted by the single operating handle 708. Also a link 714 is provided and corresponds to the link 114 in enabling both registers to be reset by the single knob 710.

Variations in constructional details will occur to those skilled in the art and the scope of the inventive concepts herein disclosed is therefore to be judged solely by the appended claims.

In this connection note will be taken of the fact that information or intelligence other than the cost and volume of a secondary additive fluid can be provided by the register means and, of course, proportions other than those herein disclosed could be established, if desired. To carry this thought a step further, the registers 438 and 638 of FIGS. 6 and 7 could be set so that one set of register wheels would indicate the state tax and the other set of register wheels would indicate the federal tax on each delivery of gasoline.

Having thus described the invention, what is claimed is novel and desired to be secured by Letters Patent of the United States is:

1. A liquid dispensing apparatus comprising a meter, primary register means having a drive connection from said meter and indicating means for exhibiting the cost and volume of liquid passing through said meter, auxiliary register means having a drive connection from said meter and indicating means for exhibiting additional data proportionally related to the cost and volume data indicated by said primary register means, said drive connection to said auxiliary register means including selective means having a pair of input pinions driven at all times by said meter, an output gear driving said indicating means, and means for moving said pair of pinions to any one of three positions, in one position one of said pinions driving the output gear at one rate, in a second position the other pinion driving the output gear at a second rate, and in a third position said output gear being free of both pinion gears.

2. A liquid dispensing apparatus comprising a meter, primary register means having a drive connection from said meter and indicating means for exhibiting the cost and volume of liquid passing through said meter, auxiliary register means driven from said meter and indicating means for exhibiting two sets of informational data, each being proportionally related to the cost data indicated by said primary register means, said auxiliary register being mounted in spaced side by side relationship with the primary register, a change gear device being mounted between said registers with the input of said device being driven from the primary register drive connection from said meter, said change gear device having an output to said auxiliary register including means for driving said two sets of the indicating means at different rates.

3. A liquid dispensing apparatus comprising a meter, primary register means having a drive connection from said meter and indicating means for exhibiting the cost and volume of liquid passing through said meter, auxiliary register means having a drive connection from said meter and indicating means for exhibiting additional cost data proportionally related to the cost and volume data indicated by said primary register means, each of said register means including a reset actuator shaft operable to zero said indicating means thereof, the said actuator shafts being linked together for simultaneous operation to reset both registers, and selective means for rendering the said indicating means of the auxiliary register means operative and inoperative with respect to the exhibition of said additional cost data including means for disconnecting the drive between said meter and said auxiliary register and a change gear device in said drive connection to said auxiliary register, said device having a gear rotatable about a fixed axis, an idler gear meshing with the fixed gear and angularly adjustable relative to said fixed axis, and a replaceable change gear meshing with said idler gear, the size of said change gear controlling the proportional relationship of said additional data to the cost and volume of liquid as registered by the primary register.

4. The combination of claim 3 in which a bracket is removably mounted in fixed relation to the change gear, and means are provided limiting said idler gear to a fixed angular position wherein only a given size of change gear mounted on said bracket will mesh properly therewith, said bracket having indicia thereon visible from the exterior of said apparatus, said indicia having a predetermined relation to the size of said change gear.

References Cited in the file of this patent
UNITED STATES PATENTS

| | | |
|---|---|---|
| 2,191,870 | Sturm | Feb. 27, 1940 |
| 2,829,800 | Kirchhoff | Apr. 8, 1958 |